(12) United States Patent
Ibrahim et al.

(10) Patent No.: US 8,332,928 B2
(45) Date of Patent: Dec. 11, 2012

(54) LOCATION ATTESTATION SERVICE

(75) Inventors: Wael Ibrahim, Houston, TX (US);
Manuel Novoa, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1049 days.

(21) Appl. No.: 11/709,473

(22) Filed: Feb. 22, 2007

(65) Prior Publication Data
US 2008/0209515 A1 Aug. 28, 2008

(51) Int. Cl.
*G06F 21/00* (2006.01)
(52) U.S. Cl. .......................... 726/17; 726/21
(58) Field of Classification Search ............ 380/258
See application file for complete search history.

(56) References Cited

U.S. PATENT DOCUMENTS

| | | | | |
|---|---|---|---|---|
| 5,659,617 A * | 8/1997 | Fischer | ............ | 380/258 |
| 5,675,321 A * | 10/1997 | McBride | ............ | 340/568.2 |
| 5,760,690 A * | 6/1998 | French | ............ | 340/571 |
| 5,887,131 A * | 3/1999 | Angelo | ............ | 726/20 |
| 5,949,882 A * | 9/1999 | Angelo | ............ | 713/185 |
| 5,960,084 A * | 9/1999 | Angelo | ............ | 713/185 |
| 6,643,781 B1 * | 11/2003 | Merriam | ............ | 726/35 |
| 2003/0097589 A1 * | 5/2003 | Syvanne | ............ | 713/201 |
| 2003/0097590 A1 * | 5/2003 | Syvanne | ............ | 713/201 |
| 2003/0105971 A1 * | 6/2003 | Angelo et al. | ............ | 713/200 |
| 2003/0216143 A1 * | 11/2003 | Roese et al. | ............ | 455/456.1 |
| 2004/0111640 A1 * | 6/2004 | Baum | ............ | 713/201 |

OTHER PUBLICATIONS

Location-Based Authentication: Grounding Cyberspace for Better Security, Dorothy E. Denning and Peter F. MacDoran, Computer Fraud & Security, Feb. 1996, pp. 12-16.*

* cited by examiner

*Primary Examiner* — Gilberto Barron, Jr.
*Assistant Examiner* — Shaun Gregory

(57) ABSTRACT

In one embodiment a computer system comprises a processor and a memory module coupled to the processor and comprising logic instructions stored in a computer readable medium. The logic instructions, when executed, configure the processor to initiate, in a client computing device, a service request, in response to the service request, initiate a request for a location attestation certificate, and complete the client service request when the location attestation certificate is granted.

19 Claims, 4 Drawing Sheets

LOCATION ATTESTATION SERVICE

BACKGROUND

Modern computing and communication capabilities have created an environment in which users of computer services routinely access resources (e.g., data, applications, etc.) from different local and remote locations. For example, laptop computers and personal digital assistants (PDAs) are commonly used at one or more locations at work in an office setting, and may be taken home or to other locations. Similarly, resources may be located on a computing device(s) that are situated in a remote location and coupled via a communication network. Techniques to manage access to computing resources based at least in part on a location parameter may find utility within information technology (IT) departments.

DETAILED DESCRIPTION

Figure 1:
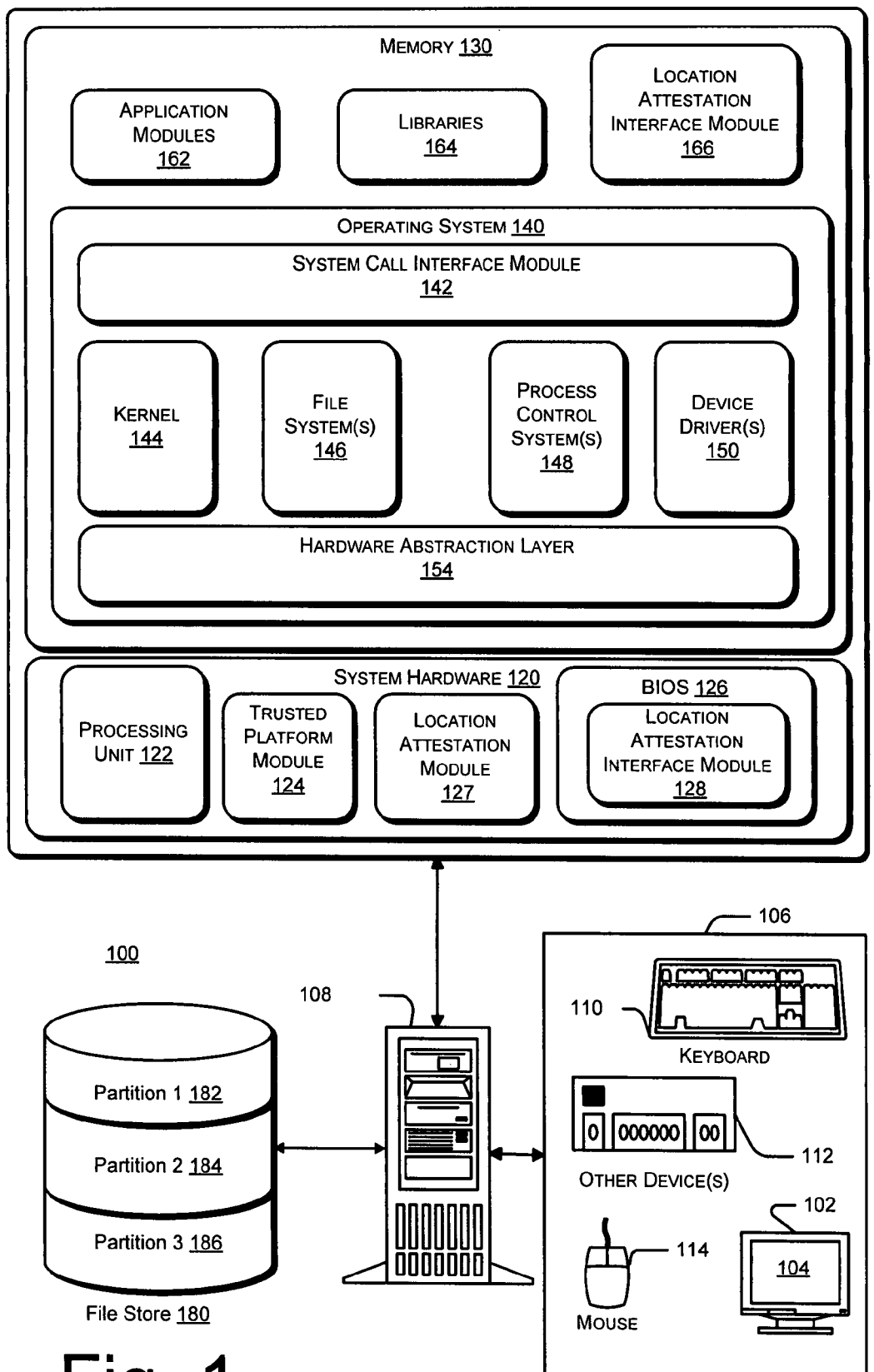
FIG. 1 is a schematic illustration of one embodiment of a computer system adapted to incorporate a location attestation service.

FIG. 1 is a schematic illustration of a computing system 100 adapted to include a location attestation service. In the illustrated embodiment, system 100 may be embodied as a hand-held or stationary device for accessing the Internet, a desktop PC, notebook computer, personal digital assistant, or any other processing devices that have a basic input/output system (BIOS), Startup Firmware, or equivalent.

The computing system 100 includes a computing engine 108 and one or more accompanying input/output devices 106 including a display 102 having a screen 104, a keyboard 110, other I/O device(s) 112, and a mouse 114. The other device(s) 112 may, for example, include a touch screen, a voice-activated input device, a track ball, and any other device that allows the system 100 to receive input from a developer and/or a user.

The computing engine 108 includes system hardware 120 commonly implemented on a motherboard and at least one auxiliary circuit board. System hardware 120 includes a processor 122 and a basic input/output system (BIOS) 126. BIOS 126 may be implemented in flash memory and may comprise logic operations to boot the computer device and a power-on self-test (POST) module for performing system initialization and tests. In operation, when activation of computing system 100 begins processor 122 accesses BIOS 126 and shadows the instructions of BIOS 126, such as power-on self-test module, into operating memory. Processor 122 then executes power-on self-test operations to implement POST processing.

In some embodiments, system hardware 120 may further include a trusted platform module (TPM) 124, which is used to establish a trusted computing relationship between computer system 100 and at least one other computer system. In some embodiments TPM 124 may be embodied as an application specific integrated circuit (ASIC). Alternatively, TPM 124 may be embodied as logic instructions encoded in a programmable controller, e.g., a field programmable gate array (FPGA) or as logic instructions stored in a computer-readable medium and executable on a general purpose processor, e.g., software. TPM 124 may include non-volatile random access memory (NVRAM), which may be used, e.g., to store certificates, among other things.

In some embodiments location information for the computer system 100 may be stored in a platform configuration register (PCR) or other non volatile memory in the TPM. The PCR is a register in the TPM that contains values representative of the platform configuration and state. The PCR may be used to store result(s) of a chain of message digests representing various platform configurations such as BIOS, boot block, etc. For example, a location parameter may be extended to one of the PCRs, which would be part of the integrity metrics of the platform.

Computer system 100 further includes a file store 180 communicatively connected to computing engine 108. File store 180 may be internal such as, e.g., one or more hard drives, or external such as, e.g., one or more external hard drives, network attached storage, or a separate storage network. In some embodiments, the file store 180 may include one or more partitions 182, 184, 186.

Memory 130 includes an operating system 140 for managing operations of computing engine 108. In one embodiment, operating system 140 includes a hardware abstraction layer 154 that provides an interface to system hardware 120. In addition, operating system 140 includes a kernel 144, one or more file systems 146 that manage files used in the operation of computing engine 108 and a process control subsystem 148 that manages processes executing on computing engine 108. Operating system 140 further includes one or more device drivers 150 and a system call interface module 142 that provides an interface between the operating system 140 and one or more application modules 162 and/or libraries 164. The various device drivers 150 interface with and generally control the hardware installed in the computing system 100.

In operation, one or more application modules 162 and/or libraries 164 executing on computing engine 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware abstraction layer 154 to interface with the system hardware 120. The operating system kernel 144 can be generally considered as one or more software modules that are responsible for performing many operating system functions.

The particular embodiment of operating system 140 is not critical to the subject matter described herein. Operating system 140 may, for example, be embodied as a UNIX operating system or any derivative thereof (e.g., Linux, Solaris, etc.) or as a Windows® brand operating system or another operating system.

In some embodiments, computer system 100 includes at least one location attestation module (LAM) 127, which may comprise operational logic and may include or invoke hardware that can communicate with at least one remote device. In the embodiment depicted in FIG. 1, BIOS 126 includes a location attestation interface module (LAIM) 128 and system memory 130 includes a LAIM 166, which communicate with a location attestation service interface device (LASID) 280. Operations implemented by the location attestation interface modules 128, 166 will be discussed in greater detail below, with reference to FIG. 3 and FIG. 4.

Figure 2:
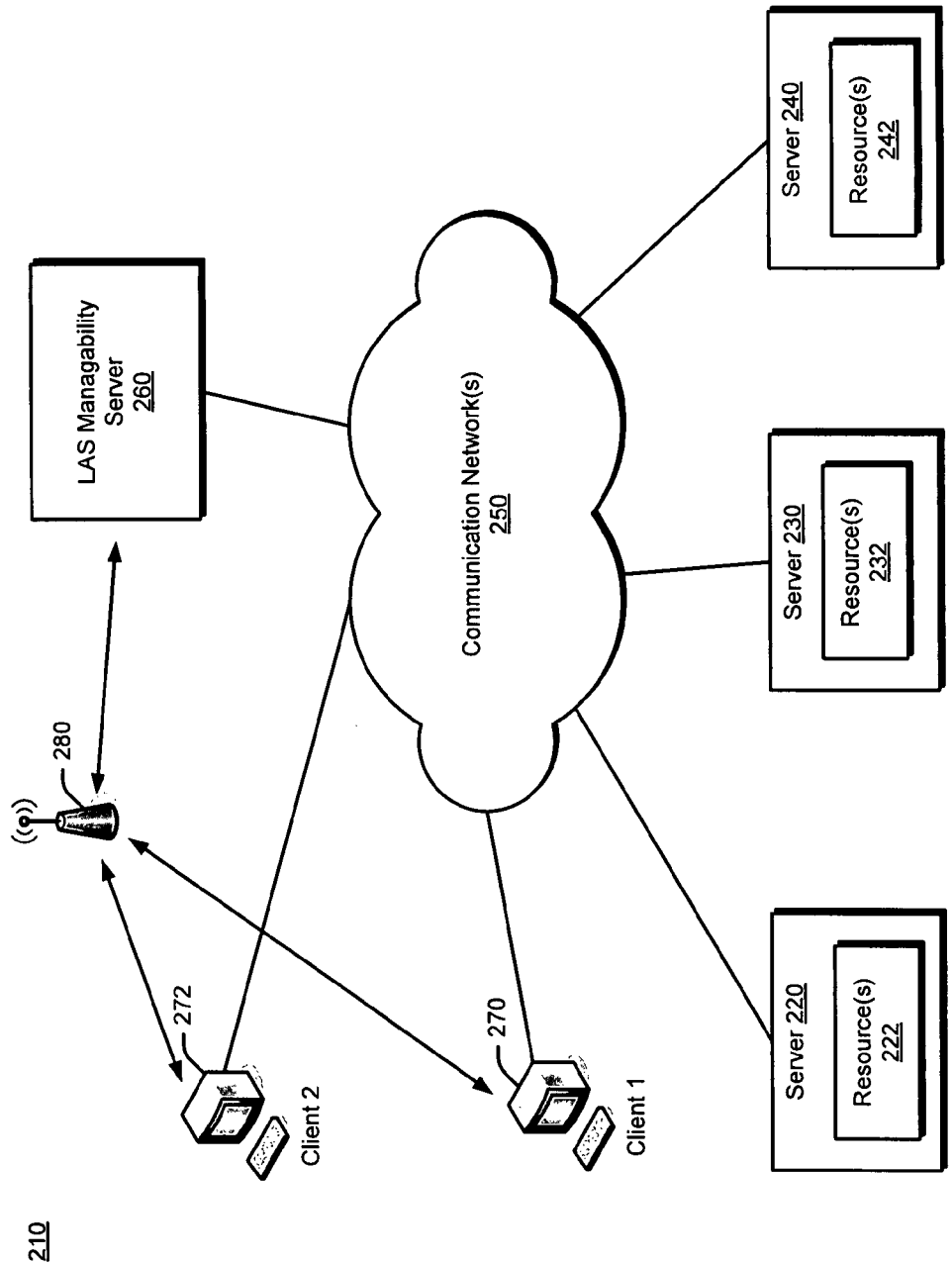
FIG. 2 is a schematic illustration of one embodiment of a networked computing environment in which a location attestation service may be implemented.

FIG. 2 is a schematic illustration of one embodiment of a networked computing environment 210 in which a location attestation service may be implemented. The networked computing environment 210 is intended to illustrate a conventional client-server network configuration, and may represent a computing environment that spans a corporate or college campus, a city, or an entire geographic region.

Computing environment 210 comprises a number of resource servers 220, 230, 240 communicatively coupled by at least one communication network 250. In the embodiment depicted in FIG. 2, servers 220, 230, 240 comprise respective resources 222, 232, 242, such as, e.g., applications, storage, or other resources. Servers 220, 230 240 need not be centrally located. Servers 220, 230, 240 may be physically remote from one another and maintained separately.

Servers 220, 230, 240 are connected to a communication network 250, which may be implemented as a Local Area Network (LAN), Metropolitan Area Network (MAN) or a Wide Area Network (WAN) or the like. Further, communication network 250 may comprise one or more sub-networks. For example, communication network 250 may comprise one or more wireless access points (WAPs) that establish a wireless network, which is coupled to a LAN or directly to a backbone network such as the Internet.

At least one (e.g., n) client computer(s) 270, 272 may be coupled to servers 220, 230, 240 via communication network 250. Each client computer 270, 272 in the computing environment 210 may be implemented as a fully functional client computer, such as the computer system 100 depicted in FIG. 1, or as a thin client computing device. The number of clients (n) may be related to the computing power of the servers 220, 230, 240. If the servers have a high degree of computing power (for example, fast processor(s) and/or a large amount of system memory) then they will be able to effectively serve a relatively large number of client computers.

Computing environment 210 further includes a location attestation service manageability server (LASMS) 260, which is coupled via communication network(s) 250 to servers 220, 230, 240. LASMS 260 cooperates with at least one of the location attestation module(s) 128, 166 of the client computer(s) to implement a location attestation service.

Computer environment 210 further includes at least one location attestation service interface device (LASID) 280. In some embodiments, LASID 280 may be implemented as an 802.1x access point, a wireless USB, a wired network interface card (NIC) that utilizes optional fields in the dynamic host configuration protocol (DHCP) header. In some embodiments, LASID may be implemented using other connection protocols such as RFID, BlueTooth, etc. LASID 280 provides the conduit (or proxy) that communicates with a LASMS to request a location attestation.

Figure 3:
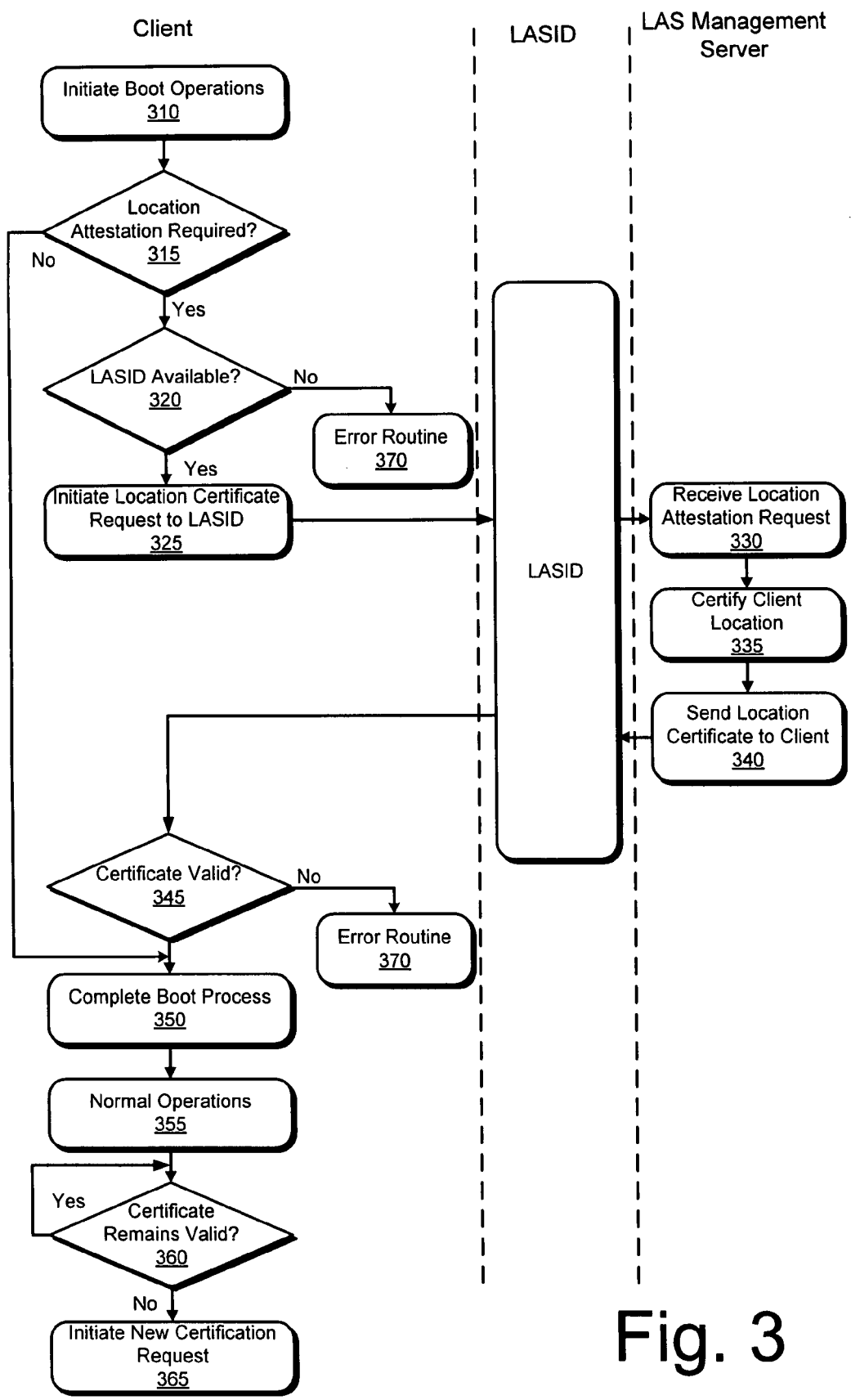
FIG. 3 is a flowchart illustrating operations in one embodiment of implementing a location attestation service.

In some embodiments, the location attestation module(s) 128, 166 of computer system 100 communicate with the location attestation interface device(s) 280, which in turn communicates with the LASMS 260 to manage the boot process of computer system 100. FIG. 3 is a flowchart illustrating operations in one embodiment of implementing a location attestation service. Referring to FIG. 3, at operation 310 boot operations of computer system 100, referred to as the client in FIG. 3, are initiated, e.g., by BIOS 126 when a user turns on the computer system 100.

During the boot process logic in the firmware or BIOS 126 determines that location attestation is required in order to boot up the computer system 100. For example, a user or system administrator responsible for maintaining computer system 100 may modify the BIOS to require location attestation in order to boot computer system 100.

If, at operation 315, location attestation is not required, then control passes to operation 350 and the boot process is completed. By contrast, if location attestation is required, then control passes to operation 320, and location attestation interface module 128 checks whether a LASID (Location Attestation Interface Device) 280 is available. For example, location attestation interface module 128 may generate an inquiry, which is transmitted to LASID 280 via a wireless or wired connection.

If, at operation 320, the location attestation server 260 is unavailable, then an error routine is invoked (operation 370). In some embodiments the error routine may comprise generating an error message which may be presented on a user interface such as display 102.

By contrast, if at operation 320 the LASID 280 is available, then the location attestation interface module 128 initiates a request, at operation 325, for a location attestation certificate from LASMS 260. Optionally, the location attestation module may implement a procedure to ensure LASMS 260 is trusted. For example, location attestation interface module 128 may exchange private keys with LASMS 260. In some embodiments, the request may include an identifier associated with the computer system 100, an identifier associated with the user of the computer system 100, and an identifier associated with a location of the computer system 100. For example, the request may include an identifier of a wireless access point to which the computer system 100 is coupled when the request is originated. Other parameters may be included in the request.

The request is transmitted via a wireless communication link to the LASID 280 which, in turn, transmits the request to the location attestation server 260, which receives the request at operation 330. The LASMS 260 certifies the client location at operation 335. In some embodiments the client location is certified by establishing a certificate request with the location attestation server. In embodiments, a location identifier in the certificate request may be compared with a list of approved location identifier. In some embodiments, LASMS 260 may implement a challenge-response routine to present the user of computer system 100 with a challenge to establish the location of computer system 100. The LASMS 260 grants a location attestation certificate at operation 340. The certificate is transmitted to computer system 100 via communication network 250.

The location attestation interface module 128 validates the location attestation certificate received from the location attestation server 260. If the received certificate is not valid, then an error routine (operation 370) is invoked. By contrast, if the received certificate is valid, then the boot process is completed (operation 350) and the computer system 100 continues normal operations (operation 355).

In some embodiments the location attestation certificate may be issued with a finite life span. Thus, the computer system 100 may include a second location attestation interface module 166, which may be embodied as logic instructions stored in memory module 130. Location attestation interface module 166 monitors the status of the location attestation certificate (operation 360). If the certificate is invalid, then the second location attestation interface module 166 initiates a new certificate request process. In some embodiments, the certificate request process may be analogous to the process implemented in operations 325-345. If the LASMS 260 provides another valid location attestation certificate, then normal computing operations may be resumed. By contrast, if the certificate request fails, then an error routine may be invoked.

Thus, the operations depicted in FIG. 3 condition the boot-up of a computer system 100 on the receipt of a valid location attestation certificate from a LASMS 260. An owner or administrator of computer system 100 may use these operations to prevent computer system 100 from booting when the computer system 100 is outside an approved location, for example if the computer is stolen or removed from a work premises without permission.

Figure 4:
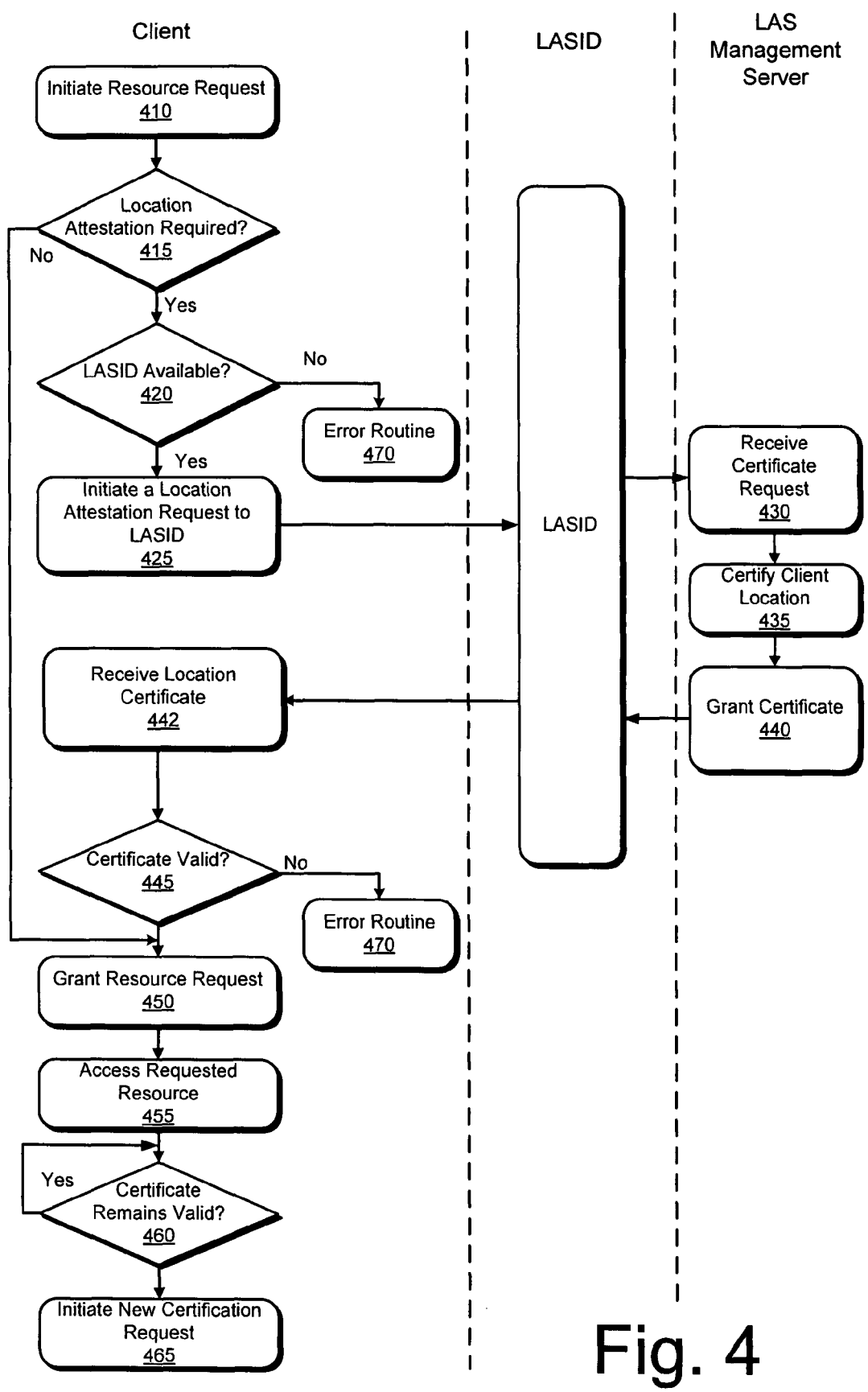
FIG. 4 is a flowchart illustrating operations in one embodiment of implementing a location attestation service.

In other embodiments a location attestation certification process may be used to condition access to one or more resources on the computer system 100 or one or more resources 222, 232, 242 on servers 220, 230, 240, respectively. FIG. 4 is a flowchart illustrating operations in one embodiment of implementing a location attestation service. Referring to FIG. 4, at operation 410 a resource request is initiated by the computer system 100. For example, the resource request may comprise a request to access a specific partition 182, 184, 186 of file store 180 or a specific application module(s) 162 or library(ies) 164 on computer system 100. Alternatively, or in addition, the resource request may comprise a request to access a resource 222, 232, 242 on a server 220, 230, 240, respectively.

Logic in either the location attestation interface module 166 or in one of the servers 220, 230, 240 determines whether location attestation is required in order to access the requested resource. For example, a user or system administrator responsible for maintaining computer system 100 may require location attestation to access data stored in a partition 182, 184, 186 of file store 180 or to access a specific application 162 on computer system 100 or a resource 222, 232, 242.

If, at operation 415, location attestation is not required, then control passes to operation 450 and the resource request is granted. By contrast, if location attestation is required, then control passes to operation 420, and location attestation interface module 166 determines whether the LASID 280 is available. For example, location attestation interface module 166 may generate an inquiry, which is transmitted to LASID 280 over a wireless communication link.

If, at operation 420, the LASID 280 is unavailable, then an error routine is invoked (operation 470). In some embodiments the error routine may comprise generating an error message which may be presented on a user interface such as display 102.

By contrast, if at operation 420 the LASID 280 is available, then the location attestation interface module 166 initiates a request, at operation 435, for a location attestation certificate. The request is transmitted via a wireless communication link to LASID 280, which in turn transmits the request to LASMS 260. Optionally, the location attestation interface module 166 may implement a procedure to ensure LASMS 260 is trusted. For example, location attestation interface module 166 may exchange private keys with location attestation server 260. In some embodiments, the request may include an identifier associated with the computer system 100, an identifier associated with the user of the computer system 100, and an identifier associated with a location of the computer system 100. For example, the request may include an identifier of a wireless access point to which the computer system 100 is coupled when the request is originated. Other parameters may be included in the request.

The request is transmitted via a wireless communication link to the LASMS 260, which receives the request at operation 430. The LASMS 260 certifies the client location at operation 435. In some embodiments the client location is certified by acknowledging a certificate request with the LASMS 260. In embodiments, a location identifier in the certificate request may be compared with a list of approved location identifier. In some embodiments, location attestation module may implement a challenge-response routine to present the user of computer system 100 with a challenge to establish the location of computer system 100. The LASMS 260 grants a location attestation certificate at operation 440. The certificate is transmitted to computer system 100 via LASID 280.

The location attestation interface module 166 receives the signed certificate at operation 442. If the received certificate is not valid, for example, if the certificate is not signed by the LASMS, then an error routine (operation 470) is invoked. By contrast, if the received certificate is valid, then resource request is granted (operation 450) and the computer system 100 access the requested resource (operation 455).

In some embodiments the location attestation certificate may be issued with a finite life span. Thus, the second location attestation interface module 166 monitors the status of the location attestation certificate (operation 460). If the certificate is invalid, then the second location attestation interface module 166 initiates a new certificate request process. In some embodiments, the certificate request process may be analogous to the process implemented in operations 425-445. If the LASMS 260 provides another valid location attestation certificate, then normal computing operations may be resumed. By contrast, if the certificate request fails, then an error routine may be invoked.

The operations depicted in FIG. 4 condition access to a resource on the receipt of a valid location attestation certificate from a LASMS 260. Thus, an owner or administrator of computer system 100 may use these operations to prevent a user of computer system 100 from accessing a resource when the computer system 100 is outside an approved location, for example if the computer is stolen or removed from a work premises without permission.

The operations of FIG. 4 may apply additional conditions and award additional access privileges to resources based on location attestation. For example, location attestation may be utilized to manage access to resources to encrypted data, and the location certificate may be used in the encryption process.

In the context of a blade computing device, a location attestation service may be used to manage participation in a blade pool. A set of certificate authorities may be assigned to act as trusted third parties, which allow blades at different locations may be allowed to join a blade pool.

Thus, described herein are exemplary system and methods for implementing location attestation services in computer systems. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method, comprising:
   initiating, in a client computing device, a location attestation operation during a boot operation of the computing device prior to initiating an operating system of the computer device;
   in response to initiating the location attestation operation, requesting by the client computing device a location attestation certificate from a source external to the client computing device by transmitting an identifier associated with the client computing device to the source external to the client computing device;
   monitoring a status of the location attestation certificate, and when the location attestation certificate is invalid, requesting a new location attestation certificate;
   communicating with a location attestation service managing participation by the computing device as a blade computing device in a blade pool, wherein a set of certificate authorities is assigned as trusted third parties allowing the blade computing device and blades at different locations to join the blade pool; and
   completing the boot operation only after the location attestation certificate is granted, and terminating the boot operation when the location attestation certificate is not granted.

2. The method of claim 1, further comprising after completing the boot operation initiating, in the client computing device, a service request by initiating a request to access a resource on a partitioned section of a hard drive in the client computing device, and wherein access to the resource is only granted when the client computing device possesses a valid location attestation certificate.

3. The method of claim 1, further comprising after completing the boot operation initiating, in the client computing device, a service request by initiating a request to access a resource on a remote storage device, and wherein access to the resource is only granted when the client computing device possesses a valid location attestation certificate.

4. The method of claim 1, further comprising after completing the boot operation initiating, in the client computing device, a service request by initiating a request to start an application, and wherein the application is only started when the client computing device possesses a valid location attestation certificate.

5. The method of claim 1, wherein requesting a location attestation certificate comprises:
   initiating a communication connection with a location attestation server;
   verifying that the location attestation server is trusted; and
   receiving the location attestation certificate from the location attestation server.

6. The method of claim 1, further comprising after completing the boot operation:
   monitoring the validity of the location attestation certificate; and
   terminating access to at least one service when the location attestation server is invalidated.

7. A computer system, comprising:
   a processor;
   a memory module coupled to the processor and comprising logic instructions stored in a computer readable medium which, when executed, configure the processor to:
   initiate, in a client computing device, a location attestation operation during a boot operation of the client computing device prior to initiating an operating system of the client computing device;
   in response to initiating the location attestation operation requesting by the client computing device a location attestation certificate from a source external to the client computing device, wherein the location attestation certificate includes an indication of the location of the client computing device;
   monitoring a status of the location attestation certificate, and when the location attestation certificate is invalid, requesting a new location attestation certificate;
   communicating with a location attestation service managing participation by the client computing device as a computing device in a computing device pool, wherein a set of certificate authorities is assigned as trusted third parties allowing the computing device and computing devices at different locations to join the computing device pool; and
   complete the boot operation only after the location attestation certificate is granted, and terminating the boot operation when the location attestation certificate is not granted.

8. The computer system of claim 7, further comprising logic instructions stored in a computer readable medium which, when executed, cause the processor to request to access a resource on a partitioned section of a hard drive in the client computing device, and wherein access to the resource is only granted when the client computing device possesses a valid location attestation certificate.

9. The computer system of claim 7, further comprising logic instructions stored in a computer readable medium which, when executed, cause the processor to initiate a request to access a resource on a remote storage device, and wherein access to the resource is only granted when the client computing devices possesses a valid location attestation certificate.

10. The computer system of claim 7, further comprising logic instructions stored in a computer readable medium which, when executed, cause the processor to initiate a request to start an application, and wherein the application is only started when the client computing devices possesses a valid location attestation certificate.

11. The computer system of claim 7, further comprising logic instructions stored in a computer readable medium which, when executed, cause the processor to:
   initiate a communication connection with a location attestation server;
   verify that the location attestation server is trusted; and
   request a location attestation certificate from the location attestation server.

12. The computer system of claim 7, further comprising logic instructions stored in a computer readable medium which, when executed, cause the processor to:
   monitor the validity of the location attestation certificate; and
   terminate access to at least one service when the location attestation server is invalidated.

13. A computer system, comprising:
   system hardware comprising:
   a basic input output system (BIOS) configured to perform a system initialization of the computer system and configured to complete a boot of the computer system to initiate an operating system of the computer system only with a valid local attestation certificate;
   a local attestation module configured to request the location attestation certificate from a location attestation interface device external to the computer system by transmitting an identifier associated with the computer system to the location attestation interface device; and wherein the computer system is configured as a blade computing device connecting with a location attestation service managing participation of blade computing devices in a blade pool, such that a set of certificate authorities is assigned as trusted third parties allowing the computer system and blades at different locations to join the blade pool.

14. The computer system of claim 13, wherein the location attestation module is configured to:
initiate a communication connection with the location attestation interface device; and
verify that the location attestation interface device is trusted.

15. The method of claim 1, wherein the identifier associated with the client computing device comprises at least one of an identifier associated with the client computing device, an identifier associated with a user of the client computing device, or an identifier associated with a location of the client computing device.

16. The computer system of claim 13, wherein the location attestation interface device is configured to certify location of the computer system by comparing the location identifier with a list of approved location identifiers.

17. The computer system of claim 16, wherein the location attestation interface device is configured to present a user of the computer system with a challenge-response routine to establish location of the computer system before granting the location attestation certificate.

18. The computer system of claim 13, wherein the location attestation module is configured to prevent computer system 100 from booting when the computer system 100 is outside an approved location when the computer is stolen or removed from a work premises without permission.

19. The computer system of claim 13, further comprising a second location attestation interface module to monitor a status of the location attestation certificate, and when the location attestation certificate is invalid, requesting a new location attestation certificate.

* * * * *